United States Patent
Ativanichayaphong et al.

(10) Patent No.: US 8,788,620 B2
(45) Date of Patent: Jul. 22, 2014

(54) WEB SERVICE SUPPORT FOR A MULTIMODAL CLIENT PROCESSING A MULTIMODAL APPLICATION

(75) Inventors: Soonthorn Ativanichayaphong, Boca Raton, FL (US); Charles W. Cross, Jr., Wellington, FL (US); Gerald M. McCobb, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1521 days.

(21) Appl. No.: 11/696,230

(22) Filed: Apr. 4, 2007

(65) Prior Publication Data
US 2008/0249782 A1 Oct. 9, 2008

(51) Int. Cl.
- G06F 15/16 (2006.01)
- H04L 29/08 (2006.01)
- G06F 3/00 (2006.01)
- G10L 21/06 (2013.01)

(52) U.S. Cl.
CPC .... H04L 29/08072 (2013.01); H04L 29/08099 (2013.01)
USPC ........... 709/218; 709/200; 709/227; 719/328; 704/270; 704/270.1

(58) Field of Classification Search
CPC .......... H04M 3/4938; H04M 2201/40; H04M 1/72561; G10L 15/265; G10L 15/22
USPC ........... 709/200, 218, 227; 719/328; 704/270, 704/270.1
See application file for complete search history.

(56) References Cited

U.S. PATENT DOCUMENTS

| 5,577,165 | A | 11/1996 | Takebayashi et al. |
| 5,584,052 | A | 12/1996 | Gulau et al. |

(Continued)

FOREIGN PATENT DOCUMENTS

| CN | 1385783 | 12/2002 |
| CN | 1385783 A | 12/2002 |

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — David Lazaro
*Assistant Examiner* — Vitali Korobov
(74) *Attorney, Agent, or Firm* — Brevetto Law Group

(57) ABSTRACT

Web service support for a multimodal client processing a multimodal application, the multimodal client providing an execution environment for the application and operating on a multimodal device supporting multiple modes of user interaction including a voice mode and one or more non-voice modes, the application stored on an application server, includes: receiving, by the server, an application request from the client that specifies the application and device characteristics; determining, by a multimodal adapter of the server, modality requirements for the application; selecting, by the adapter, a modality web service in dependence upon the modality requirements and the characteristics for the device; determining, by the adapter, whether the device supports VoIP in dependence upon the characteristics; providing, by the server, the application to the client; and providing, by the adapter to the client in dependence upon whether the device supports VoIP, access to the modality web service for processing the application.

20 Claims, 7 Drawing Sheets

(56) References Cited

U.S. PATENT DOCUMENTS

| | | | |
|---|---|---|---|
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 6,606,599 B2 | 8/2003 | Grant et al. | |
| 6,801,604 B2* | 10/2004 | Maes et al. | 379/88.17 |
| 6,856,960 B1 | 2/2005 | Dragosh et al. | |
| 6,920,425 B1 | 7/2005 | Will et al. | |
| 6,999,930 B1 | 2/2006 | Roberts et al. | |
| 7,035,805 B1 | 4/2006 | Miller | |
| 7,137,126 B1* | 11/2006 | Coffman et al. | 719/328 |
| 7,150,399 B2 | 12/2006 | Barrus et al. | |
| 7,171,243 B2 | 1/2007 | Watanabe et al. | |
| 7,188,067 B2 | 3/2007 | Grant et al. | |
| 7,260,535 B2* | 8/2007 | Galanes et al. | 704/270 |
| 7,330,890 B1 | 2/2008 | Partovi et al. | |
| 7,376,586 B1 | 5/2008 | Partovi et al. | |
| 7,487,085 B2 | 2/2009 | Cross et al. | |
| 7,848,314 B2* | 12/2010 | Cross et al. | 370/352 |
| 2002/0032751 A1* | 3/2002 | Bharadwaj | 709/218 |
| 2002/0065944 A1 | 5/2002 | Hickey et al. | |
| 2002/0092019 A1 | 7/2002 | Marcus | |
| 2002/0098891 A1 | 7/2002 | Graham et al. | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0088421 A1* | 5/2003 | Maes et al. | 704/270.1 |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0073431 A1* | 4/2004 | Galanes et al. | 704/270.1 |
| 2004/0083109 A1 | 4/2004 | Halonen et al. | |
| 2004/0113908 A1* | 6/2004 | Galanes et al. | 345/418 |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0230637 A1* | 11/2004 | Lecoueche et al. | 709/200 |
| 2004/0236574 A1 | 11/2004 | Ativanichayaphong | |
| 2004/0260562 A1 | 12/2004 | Kujirai | |
| 2005/0075884 A1 | 4/2005 | Badt, Jr. | |
| 2005/0091059 A1 | 4/2005 | Lecoeuche | |
| 2005/0131701 A1 | 6/2005 | Cross | |
| 2005/0138219 A1 | 6/2005 | Bou-ghannam et al. | |
| 2005/0138647 A1 | 6/2005 | Bou-ghannam et al. | |
| 2005/0154580 A1 | 7/2005 | Horowitz et al. | |
| 2005/0160461 A1 | 7/2005 | Baumgartner et al. | |
| 2005/0188411 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger et al. | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0224430 A1 | 10/2006 | Butt | |
| 2006/0229880 A1 | 10/2006 | White | |
| 2006/0235694 A1 | 10/2006 | Cross | |
| 2006/0287845 A1 | 12/2006 | Cross, Jr. et al. | |
| 2006/0287865 A1 | 12/2006 | Cross et al. | |
| 2006/0287866 A1 | 12/2006 | Cross, Jr. et al. | |
| 2006/0288309 A1 | 12/2006 | Cross et al. | |
| 2007/0265851 A1 | 11/2007 | Cross, Jr. et al. | |
| 2007/0274296 A1* | 11/2007 | Cross et al. | 370/356 |
| 2007/0274297 A1 | 11/2007 | Cross, Jr. et al. | |
| 2007/0288241 A1 | 12/2007 | Cross et al. | |
| 2007/0294084 A1 | 12/2007 | Cross et al. | |
| 2008/0065386 A1 | 3/2008 | Cross et al. | |
| 2008/0065387 A1 | 3/2008 | Cross, Jr. et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1* | 4/2008 | Putman et al. | 709/227 |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0177611 A1 | 7/2008 | Sommers et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross, Jr. et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |
| 2009/0094233 A1 | 4/2009 | Marvit et al. | |
| 2009/0144428 A1* | 6/2009 | Bowater et al. | 709/227 |
| 2009/0204465 A1 | 8/2009 | Pradhan | |
| 2009/0234921 A1 | 9/2009 | Dudley | |
| 2009/0287685 A1 | 11/2009 | Charnock et al. | |

FOREIGN PATENT DOCUMENTS

| | | |
|---|---|---|
| CN | 1564123 A | 1/2005 |
| EP | 0794670 A | 9/1997 |
| EP | 1450350 | 8/2004 |
| EP | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the

(56) References Cited

OTHER PUBLICATIONS

Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005, pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: 7$^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

Final Office Action, U.S. Appl. No. 11/154,896, May 14, 2008.
Final Office Action, U.S. Appl. No. 11/154,899, Jun. 23, 2009.
Office Action, U.S. Appl. No. 12/109,227, Dec. 10, 2010.
U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19, 2004, Charles W. Cross, Jr.
U.S. Appl. No. 10/733,610, filed Dec. 11, 2003, Charles W. Cross, Jr.
U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
Office Action Dated Apr. 14, 2008 in U.S. Appl. No. 11/154,899.
Office Action Dated Dec. 30, 2008 in U.S. Appl. No. 11/154,899.
Office Action Dated Dec. 21, 2007 in U.S. Appl. No. 11/154,896.
Office Action Dated Apr. 17, 2008 in U.S. Appl. No. 11/154,900.
Office Action Dated Mar. 24, 2009 in U.S. Appl. No. 11/154,900.
Final Office Action Dated Aug. 14, 2008 in U.S. Appl. No. 11/154,899.
Final Office Action Dated Jun. 23, 2009 in U.S. Appl. No. 11/154,899.
Final Office Action Dated May 14, 2008 in U.S. Appl. No. 11/154,896.
Final Office Action Dated Oct. 27, 2008 in U.S. Appl. No. 11/154,900.

* cited by examiner

WEB SERVICE SUPPORT FOR A MULTIMODAL CLIENT PROCESSING A MULTIMODAL APPLICATION

BACKGROUND OF THE INVENTION

1. Field of the Invention

The field of the invention is data processing, or, more specifically, methods, systems, and products for web service support for a multimodal client processing a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Regardless of the technology used to implement a multimodal application, processing a multimodal application typically requires modality services for each mode of user interaction supported by the multimodal application. Consider, for example, a multimodal application that supports both a graphical mode and a voice mode of user interaction. To process such a multimodal application, both a graphical modality service and a visual modality service may be required. Because modality services are modular entities that may be used to customize a processing environment for a multimodal application, processing may be provided for different multimodal applications by combining different modality services. The drawback to current technology used to process multimodal applications, however, is that such technology does not take advantage of the processing support available through web services architectures. Web services architectures are typically composed of modular web services designed to support interoperable machine to machine interaction over a network. As such, readers will recognize that a need exists for web service support for processing a multimodal application.

SUMMARY OF THE INVENTION

Methods, systems, and products are disclosed for web service support for a multimodal client processing a multimodal application, the multimodal client providing an execution environment for the multimodal application and operating on a multimodal device supporting multiple modes of user interaction including a voice mode and one or more non-voice modes, the multimodal application stored on an application server, that include: receiving, by the application server, an application request from the multimodal client, the application request specifying the multimodal application and characteristics for the multimodal device; determining, by a multimodal adapter of the application server, modality requirements for the multimodal application, the modality requirements specifying characteristics of a modality web service capable of processing multimodal applications; selecting, by the multimodal adapter of the application server, a particular modality web service in dependence upon the modality requirements and the characteristics for the multimodal device, including retrieving an interface descriptor for the particular modality web service, the particular modality web service capable of processing portions of the multimodal application that correspond to a particular mode of user interaction; determining, by the multimodal adapter of the application server, whether the multimodal device supports Voice Over Internet Protocol ('VoIP') in dependence upon the characteristics for the multimodal device; providing, by the application server, the multimodal application to the multimodal client; and providing, by the multimodal adapter of the application server to the multimodal client in dependence upon whether the multimodal device supports VoIP, access to the particular modality web service for processing the multimodal application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
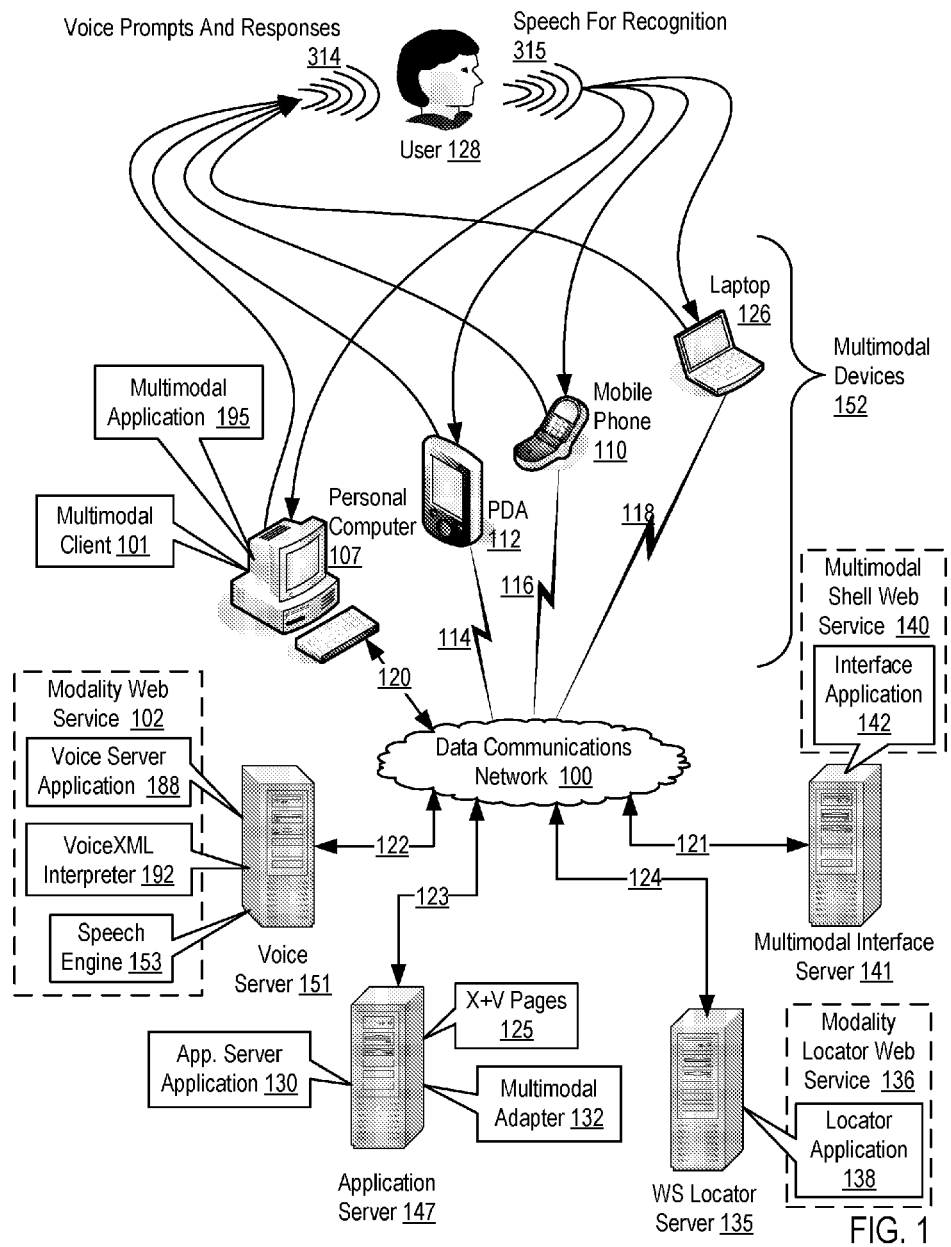
FIG. 1 sets forth a network diagram illustrating an exemplary system for web service support for a multimodal client processing a multimodal application according to embodiments of the present invention.

Exemplary methods, apparatus, and products for presenting supplemental content for digital media using a multimodal application according to embodiments of the present invention are described with reference to the accompanying drawings, beginning with FIG. 1. FIG. 1 sets forth a network diagram illustrating an exemplary system for web service support for a multimodal client processing a multimodal application according to embodiments of the present invention. The exemplary system of FIG. 1 includes a multimodal client (101) operating on a multimodal device (152). The multimodal client (101) of FIG. 1 is a software component that provides an execution environment for the multimodal application (195). The multimodal client (101) of FIG. 1 may be implemented as a multimodal browser, a Java Virtual Machine, or any other software module as will occur to those of skill in the art capable of providing an execution environment for a multimodal application.

In the exemplary system of FIG. 1, the multimodal device (152) supports multiple modes of user interaction including a voice mode and one or more non-voice modes. The voice mode is represented here with audio output of voice prompts and responses (314) from the multimodal devices and audio input of speech for recognition (315) from a user (128). Non-voice modes are represented by input/output devices such as keyboards and display screens on the multimodal devices (152).

In the exemplary system of FIG. 1, the multimodal application (195) is stored on an application server (147) in the form of one or more X+V pages (125) accessible to the multimodal client (101) through data communications network (100). Readers will note, however, that implementing the multimodal application (195) as a set of X+V pages is for explanation and not for limitation. As mentioned above, a multimodal application may also be implemented as set of SALT documents, a Java application, or using any other technology as will occur to those of skill in the art.

The application server (147) of FIG. 1 is a computing device connected to data communications network (100) through a wireline connection (123). The application server (147) of FIG. 1 provides multimodal applications to multimodal clients installed on multimodal devices. The application server (147) of FIG. 1 also brokers access to modality web services capable of processing portions of a multimodal application that correspond to particular modalities. Consider, for example, that an application server stores a multimodal application providing both a graphical mode and a voice mode of user interaction, the graphical mode implemented using HTML markup and the voice mode implemented using VoiceXML markup. Further consider that a multimodal client requests the multimodal application from the application server, but the multimodal client is only capable of processing the HTML markup. The application server may provide this multimodal application to a multimodal client and broker access to modality web service capable of processing the VoiceXML markup portions of the multimodal application that correspond to a voice mode of user interaction.

In the example of FIG. 1, the application server (147) has installed upon it an application server application (130). The application server application (130) of FIG. 1 is a software component capable of operating the application server (147) for web service support for a multimodal client processing a multimodal application according to embodiments of the present invention. The application server application (130) of FIG. 1 operates generally to provide web service support for a multimodal client processing a multimodal application according to embodiments of the present invention by receiving an application request from the multimodal client that specifies the multimodal application requested and characteristics for the multimodal device, and providing the multimodal application (195) to the multimodal client (101). The application request may specify the multimodal application using, for example, a Uniform Resource Identifier ('URI'). The characteristics for the multimodal device (152) included in the application request provide the application server (147) with information about the multimodal device (152) used in selecting a modality web service that appropriately supports the multimodal client in processing the multimodal application (195). The characteristics included in the message request may include, for example, data communications capabilities of the device (152), codecs supported by the device (152), language settings for the device (152), and any other device characteristics as will occur to those of skill in the art.

In the example of FIG. 1, the application server (147) also has installed upon it a multimodal adapter (132). The multimodal adapter (132) of FIG. 1 is a software component that brokers access to modality web services to provide web service support for a multimodal client processing a multimodal application according to embodiments of the present invention. The multimodal adapter (132) of FIG. 1 operates generally to provide web service support for a multimodal client processing a multimodal application according to embodiments of the present invention by determining modality requirements for the multimodal application (195), selecting a particular modality web service (102) in dependence upon the modality requirements and the characteristics for the multimodal device, including retrieving an interface descriptor for the particular modality web service (102), determining whether the multimodal device supports Voice Over Internet Protocol ('VoIP') in dependence upon the characteristics for the multimodal device, and providing, to the multimodal client (101) in dependence upon whether the multimodal device (152) supports VoIP, access to the particular modality web service (102) for processing the multimodal application (195). The modality requirements determined by the multimodal adapter (132) for the multimodal application (195) specify characteristics of a modality web service capable of processing multimodal applications. For example, a multimodal adapter may identify a VoiceXML markup in a particular multimodal application and determine that such a multimodal application requires a modality web service capable of processing VoiceXML markup. Further consider that the multimodal application may specify a VoiceXML style sheet that specifies text-to-speech synthesis using the voice of Mickey Mouse. A multimodal adapter may determine that such a multimodal application requires a modality web service capable of processing VoiceXML markup using the voice of Mickey Mouse for speech synthesis.

VoIP stands for 'Voice over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VoIP' protocols. VoIP traffic may be deployed on any IP data communications network, including data communications networks lacking a connection to the rest of the Internet, for instance on a private building-wide local area data communications network or 'LAN.'

A variety of protocols may be used to effect VoIP. The two most popular types of VoIP are effected with the IETF's Session Initiation Protocol ('SIP') and the ITU's protocol known as 'H.323.' SIP clients use port 5060 of the Transmission Control Protocol ('TCP') and the User Datagram Protocol ('UDP') to connect to SIP servers. SIP itself is used to set up and tear down calls for speech transmission. VoIP with SIP then uses Real-time Transport Protocol ('RTP') for transmitting the actual encoded speech. Similarly, H.323 is an umbrella recommendation from the standards branch of the International Telecommunications Union that defines protocols to provide audio-visual communication sessions on any packet data communications network.

As mentioned above, the multimodal adapter (132) provides access to the particular modality web service in dependence upon whether the multimodal device (152) supports VoIP. If the multimodal adapter (132) determines that the multimodal device (152) supports VoIP, the multimodal adapter (132) may provide access to the particular modality web service (102) by obtaining data communication endpoint information of the particular modality web service (102) in dependence upon the interface descriptor, and providing the data communication endpoint information to the multimodal client (101) for direct access to the particular modality web service (102). If the multimodal adapter (132) determines that the multimodal device does not support VoIP, the multimodal adapter (132) may provide access to the particular modality web service (102) by obtaining data communication endpoint information of the particular modality web service (102) in dependence upon the interface descriptor, and providing data communication endpoint information of the multimodal adapter (132) to the multimodal client (101) for indirect access to the particular modality web service (102) through the application server (147).

From the perspective of the multimodal client (101), the multimodal client (101) of FIG. 1 operates generally for web service support for a multimodal client processing a multimodal application according to embodiments of the present invention. The multimodal client (101) of FIG. 1 operates generally for web service support for a multimodal client processing a multimodal application according to embodiments of the present invention by transmitting the application request to the application server (147), receiving the multimodal application (195) from the application server (147) in response to the application request, receiving access to the particular modality web service (102) from application server (147) in response to the application request, and executing the multimodal application (195) using the particular modality web service (102), including providing to the particular modality web service (102) for processing the portions of the multimodal application (195) that correspond to a particular mode of user interaction capable of being processed by the particular modality web service (102).

The exemplary system of FIG. 1 includes a web service locator server (135), which is a computing device connected to data communications network (100) through a wireline connection (124). The web service locator server (135) has installed upon it a locator application (138). The locator application (138) of FIG. 1 is a software component that provides a modality locator web service (136) capable of providing an interface descriptor for a modality web service that satisfies certain criteria specified in an interface request. Readers will recall from above that the multimodal adapter (132) may retrieve an interface descriptor for the particular modality web service (102). The multimodal adapter (132) may retrieve an interface descriptor according to embodiments of the present invention by requesting the interface descriptor for the particular modality web service (102) from the modality locator web service (136). The locator application (138) provides the modality locator web service (136) by receiving interface descriptor requests from the multimodal adapter and providing, in response, interface descriptors based on the request. The request may specify particular characteristics regarding the modality web services whose interface descriptors are returned to the multimodal adapter (132). For example, the multimodal adapter may specify in an interface descriptor request that the only interface descriptors of interest to the adapter (132) are interface descriptors of modality web services capable of processing VoiceXML mark and providing text-to-speech synthesis using the voice of Mickey Mouse.

In the exemplary system of FIG. 1, the modality web service (102) provides voice services to multimodal clients processing multimodal applications. The modality web service (102) is provided by a voice server (151), which is a computing device connected to the data communications network (100) through a wireline connection (122). The voice server (151) run a speech engine (153) that provides voice recognition services for multimodal devices by accepting requests for speech recognition and returning text representing recognized speech. Voice server (151) also provides speech synthesis, text-to-speech ('TTS') conversion, for voice prompts and voice responses (314) to user input in multimodal applications such as, for example, X+V applications, SALT applications, or Java voice applications.

The voice server (151) in the example of FIG. 1 has installed upon it a voice server application (188), a VoiceXML interpreter (192), and a speech engine (153). The voice server application (188) is a software component capable of operating a voice server in a system that provides web service support for a multimodal client processing a multimodal application according to embodiments of the present application. The voice server application (188) of FIG. 1 processes web services messages used to establish a VoIP connection between the voice server (151) and either the application server (147) or the multimodal device (152), depending on whether the multimodal device (152) supports VoIP. The voice server application also processes voice service requests provided through the VoIP connection using, for example, the VoiceXML interpreter (192) and the speech engine (153). The voice server application (188) may access the VoiceXML interpreter (192) and the speech engine (153) through application programming interfaces ('APIs') exposed by each component respectively. Although in the example of FIG. 1, the voice server application (188) passes the speech along to the speech engine (153) through a VoiceXML interpreter (192), readers will note that the voice server application (188) may pass the speech along to the speech engine (153) through either Java Virtual Machine ('JVM'), a VoiceXML interpreter (192), or a SALT interpreter, depending on whether the multimodal application is implemented in X+V, Java, or SALT.

The VoiceXML interpreter (192) of FIG. 1 is a software component that provides speech recognition and speech synthesis for a multimodal application implemented using, for example, X+V. The multimodal application provides the voice server application (188) with voice dialog instructions, typically in the form of a VoiceXML <form> element. The voice server application (188) then, in turn, passes the voice dialog instructions to the VoiceXML interpreter (192). The VoiceXML interpreter (192) administers the speech engine (153) based on the voice dialog instructions and returns the speech engine (153) output to the multimodal application through the voice server application (188). Depending on whether the multimodal device supports VoIP, the voice server application (188) may communicate with the multimodal client (101) indirectly through the application server (147) or directly to the multimodal device (152). The voice dialog instructions received from a multimodal application may include, for example, one or more grammars, data input elements, event handlers, and so on, that advise the VoiceXML interpreter (192) how to administer voice input from a user and voice prompts and responses to be presented to a user. The VoiceXML interpreter (192) administers such dialogs by processing the dialog instructions sequentially in accordance with a VoiceXML Form Interpretation Algorithm ('FIA'). The output from the speech engine (153) provided to the multimodal application may be in the form of recognized speech, semantic interpretation results, digitized speech for voice prompts, and so on.

As mentioned above, the voice dialog instructions processed by the VoiceXML interpreter (192) typically include one or more grammars. A grammar communicates to the speech engine (153) the words and sequences of words that currently may be recognized. A grammar typically includes grammar rules that advise a speech engine or a VoiceXML interpreter which words and word sequences presently can be recognized. Grammars for use according to embodiments of the present invention may be expressed in any format supported by an ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. For example, consider the following exemplary grammar expressed in JSFG:

```
<grammar scope="dialog"><![CDATA[
    #JSGF V1.0 iso-8859-1;
    grammar browse;
    public<browse> = <command> (<object> | <actor> | <character>)
        [<doing>];
    <command> = show[me] | find | where is | what is | who is;
    <doing> = wearing | eating | drinking | driving | kissing;
    <object> = BMW | automobiles | cars | Armani suit | champagne | Dom
        Perignon | Barcelona Chair;
    <actor> = [Daniel] [Craig] | [Eva] [Green] | [Mads] [Mikkelsen] |
        [Judi] [Dench] | [Ivana] [Milicevic];
    <character> = [James] [Bond] | [Vesper] [Lynd] | Le Chiffre | M |
        Valenka | [The] Bond Women;
    ]]>
</grammar>
```

In this example, the elements named <browse>, <command>, <doing>, <object>, <actor>, and <character> are rules of the grammar. Rules are a combination of a rulename and an expansion of a rule that advises a speech engine or a VoiceXML interpreter which words presently can be recognized. In the example above, rule expansions includes conjunction and disjunction, and the vertical bars '|' mean 'or.' A speech engine or a VoiceXML interpreter processes the rules in sequence, first <browse>, then <command>, then <doing>, then <object>, then <actor>, and then <character>. The <browse> rule accepts for recognition whatever is returned from the <command> rule along with whatever is returned from the <object> rule, the <actor> rule, or the <character> rule, and optionally whatever is returned from the <doing> rule. The browse grammar as a whole matches utterances like these, for example:

"Show me the Bond Women,"
"Who is James Bond kissing,"
"What is Bond wearing," and
"Find Judi Dench."

As mentioned above, the voice server (151) includes a speech engine (153). The speech engine (153) of FIG. 1 is a functional module, typically a software module, although it may include specialized hardware also, that does the work of recognizing and synthesizing speech. The speech engine (153) of FIG. 1 implements speech recognition by use of a further module referred to in this specification as a automatic speech recognition ('ASR') engine, and the speech engine carries out speech synthesis by use of a further module referred to in this specification as a text-to-speech ('TTS') engine.

The speech engine (153) also includes a grammar, a lexicon, and a language-specific acoustic model. The language-specific acoustic model is a data structure, a table or database, for example, that associates Speech Feature Vectors ('SFV') with phonemes representing, to the extent that it is practically feasible to do so, all pronunciations of all the words in a human language. A SFV may be defined, for example, by the first twelve or thirteen Fourier or frequency domain components of a sample of digitized speech. The lexicon is an association of words in text form with phonemes representing pronunciations of each word; the lexicon effectively identifies words that are capable of recognition by an ASR engine. To provide speech recognition, the ASR engine receives speech for recognition in the form of at least one digitized word and uses frequency components of the digitized word to derive a SFV. The ASR engine can use the SFV to infer phonemes for the word from the language-specific acoustic model and, in turn, uses the phonemes to find the word in the lexicon. To provide speech synthesis, the TTS Engine accepts text as input and returns the same text in the form of digitally encoded speech, for use in providing speech as prompts for and responses to users of multimodal systems.

The exemplary system of FIG. 1 includes a multimodal interface server (141), which is a computing device connected to data communications network (100) through a wireline connection (121). The multimodal interface server (141) has installed upon it an interface application (142). The interface application (142) of FIG. 1 is a software component that provides a multimodal shell web service (140) capable of providing a multimodal client with a customized user interface. The multimodal shell web service (140) of FIG. 1 operates generally to provide web service support for a multimodal client processing a multimodal application according to embodiments of the present invention. The multimodal shell web service (140) operates generally to provide web service support for a multimodal client processing a multimodal application according to embodiments of the present invention by receiving a multimodal interface request from the multimodal client that specifies user data for a user of the multimodal device and attributes of the multimodal device, configuring a multimodal interface in dependence upon the multimodal interface request, and providing the multimodal interface to the multimodal client. The user data that is included in the multimodal interface request is data that describes a user of the multimodal device (152). For example, user data may include a user identifier, a user profile, or any other data describing a user of the multimodal device.

Attributes of the multimodal device describe the multimodal device itself and the software installed on the multimodal device. For example, attribute of the multimodal device may include a device identifier, display type for the device, information indicating whether the device supports JavaScript, the version of the multimodal browser installed on the device, the types of codecs supported by the device, or any other information describing the multimodal device as will occur to those of skill in the art. Using the user data and the attributes for the multimodal device, the multimodal shell web service (140) may configure a customized multimodal interface for the multimodal client (101) operating on the multimodal device (152).

As mentioned above, the multimodal client (101) of FIG. 1 operates generally for web service support for a multimodal client processing a multimodal application according to embodiments of the present invention. In addition to the functionality described above, the multimodal client (101) of FIG. 1 may also operates generally for web service support for a multimodal client processing a multimodal application according to embodiments of the present invention by transmitting a multimodal interface request to a multimodal shell web service (102), receiving a multimodal user interface from the multimodal shell web service (140) in response to the user interface request, and rendering the multimodal user interface to a user.

In the exemplary system of FIG. 1, a multimodal device (152) on which a multimodal application (195) operates is an automated device, that is, automated computing machinery or a computer program running on an automated device, that is capable of accepting from users more than one mode of input such as, for example, keyboard, mouse, stylus, and so on, including speech input—and also providing more than one mode of output such as, for example, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, a multimodal application may refer to any software application, server-oriented or client-oriented, thin client or thick client, that administers more than one mode of input and more than one mode of output, typically including visual and speech modes.

The system of FIG. 1 includes several example multimodal devices:
- personal computer (107) which is coupled for data communications to data communications network (100) through wireline connection (120),
- personal digital assistant ('PDA') (112) which is coupled for data communications to data communications network (100) through wireless connection (114),
- mobile telephone (110) which is coupled for data communications to data communications network (100) through wireless connection (116), and
- laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled:
   RTP Payload Format for European Telecommunications Standards Institute (ETSI) European Standard ES 201 108 Distributed Speech Recognition Encoding,
and the Internet Draft entitled:
   RTP Payload Formats for European Telecommunications Standards Institute (ETSI) European Standard ES 202 050, ES 202 211, and ES 202 212 Distributed Speech Recognition Encoding,
the IETF provides standard RTP payload formats for various codecs. It is useful to note, therefore, that there is no limitation in the present invention regarding codecs, payload formats, or packet structures. Speech for web service support for a multimodal client processing a multimodal application according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

Readers will note that the use of the four example multimodal devices (152) described above is for explanation only, not for limitation of the invention. Any automated computing machinery capable of accepting speech from a user, providing digitized speech to an application server or a voice modality web service, and receiving and playing speech prompts and responses from the application server or the voice modality web service may be improved to function as a multimodal device according to embodiments of the present invention.

The system of FIG. 1 includes a data communications network (100) that connects the multimodal devices (152), the application server (147), the voice server (151), the web services locator server (135), and the modality interface server (141) for data communications. A data communications network for web service support for a multimodal client processing a multimodal application according to embodiments of the present invention may be composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:
a link layer with the Ethernet™ Protocol or the Wireless Ethernet™ Protocol,
a data communications network layer with the Internet Protocol ('IP'),
a transport layer with the Transmission Control Protocol ('TCP') or the User Datagram Protocol ('UDP'),
an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
other protocols as will occur to those of skill in the art.

The arrangement of the multimodal devices (152), the application server (147), the voice server (151), the web services locator server (135), the modality interface server (141), and the data communications network (100) making up the exemplary system illustrated in FIG. 1 are for explanation, not for limitation. Data processing systems useful for web service support for a multimodal client processing a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

As mentioned above, if a multimodal adapter of an application server determines that a multimodal device supports VoIP, the multimodal adapter may provide access to a particular modality web service by providing data communication endpoint information of the modality web service to the multimodal client for direct access to the particular modality web service. For further explanation, FIG. 2 sets forth a block diagram of an exemplary system configured to provide web service support for a multimodal client (101) processing a multimodal application (195) according to embodiments of the present invention in which a multimodal adapter (132) of an application server (147) determines that a multimodal device (152) supports VoIP. The multimodal client (101) of FIG. 2 operates on a multimodal device (152) and provides an execution environment for the multimodal application (195). The multimodal client (101) of FIG. 2 may be implemented as a multimodal browser (196) when the multimodal application (195) is implemented using X+V or SALT or may be implemented as a Java Virtual Machine (200) when the multimodal application (195) is implemented as a Java speech application.

Figure 2:
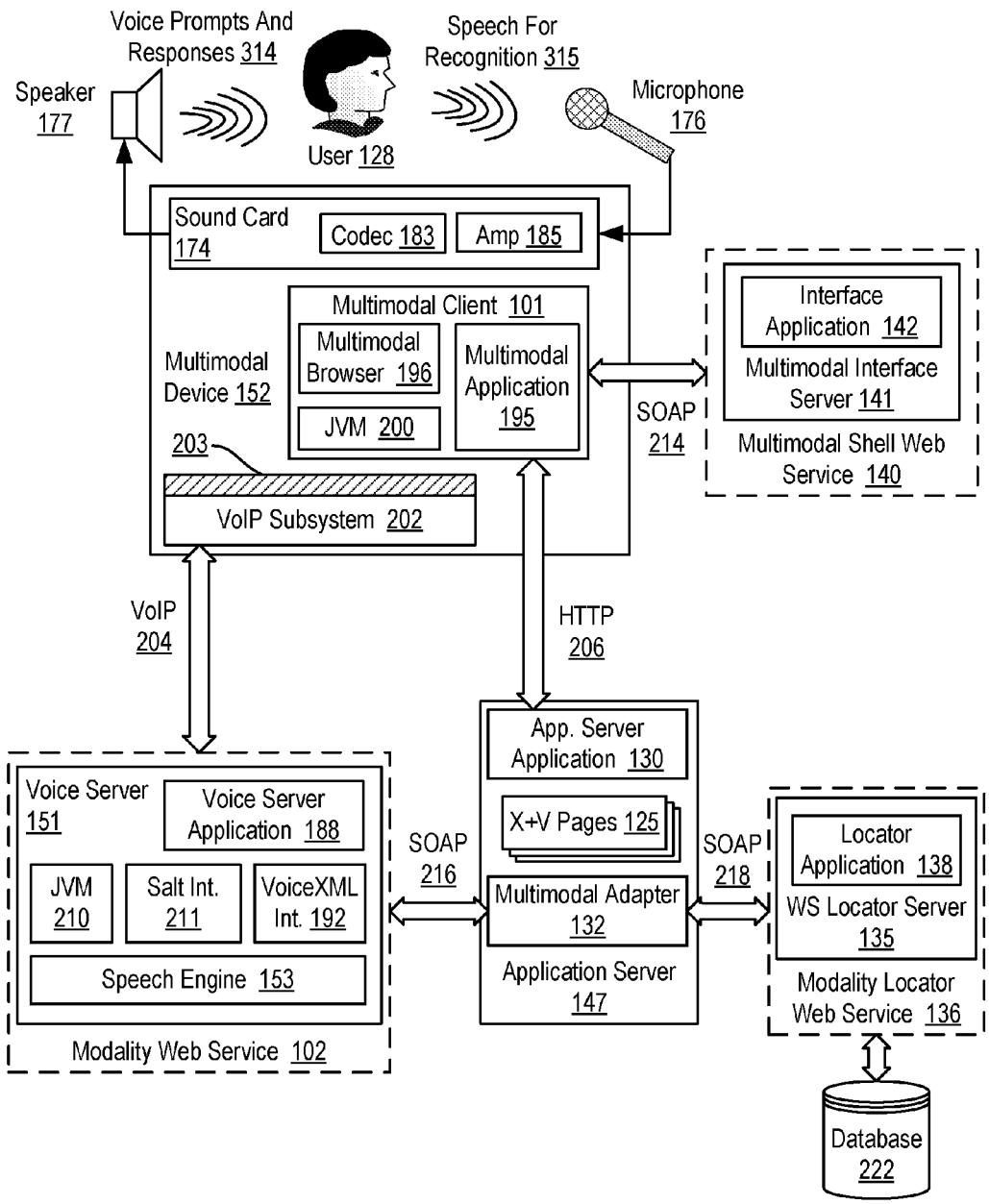
FIG. 2 sets forth a block diagram of an exemplary system configured to provide web service support for a multimodal client processing a multimodal application according to embodiments of the present invention.

In the exemplary system of FIG. 2, the multimodal device (152) supports multiple modes of user interaction including a voice mode and one or more non-voice modes. The voice mode is represented here with audio output of voice prompts and responses (314) from the multimodal devices and audio input of speech for recognition (315) from a user (128). The multimodal device (152) provides playback of voice prompts and responses (314) using speaker (177) and accepts audio input of speech for recognition (315) through microphone (176). The speech for recognition (315) is then digitized through an audio amplifier (185) and a coder/decoder ('codec') (183) of a sound card (174). Non-voice modes are represented by input/output devices such as keyboards and display screens on the multimodal device (152).

In the exemplary system of FIG. 2, the multimodal application (195) is stored on an application server (147) in the form of one or more X+V pages (125). Readers will note, however, that implementing the multimodal application (195) as a set of X+V pages is for explanation and not for limitation. As mentioned above, a multimodal application may also be implemented as set of SALT documents, a Java application, or using any other technology as will occur to those of skill in the art.

The exemplary system of FIG. 2 also includes an application server (147) that provides multimodal applications to multimodal clients installed on multimodal devices. The application server (147) of FIG. 2 also brokers access to modality web services capable of processing portions of a multimodal application that correspond to particular modalities. Consider, for example, that an application server stores a multimodal application providing both a graphical mode and a voice mode of user interaction, the graphical mode implemented using HTML markup and the voice mode implemented using VoiceXML markup. Further consider that a multimodal client requests the multimodal application from the application server, but the multimodal client is only capable of processing the HTML markup. The application server may provide this multimodal application to a multimodal client and broker access to modality web service capable of processing the VoiceXML markup portions of the multimodal application that correspond to a voice mode of user interaction.

In the example of FIG. 2, the application server (147) has installed upon it an application server application (130). The application server application (130) of FIG. 2 is a software component capable of operating the application server (147) for web service support for a multimodal client processing a multimodal application according to embodiments of the present invention. The application server application (130) of FIG. 2 operates generally to provide web service support for a multimodal client processing a multimodal application according to embodiments of the present invention by receiving an application request from the multimodal client that specifies the multimodal application requested and characteristics for the multimodal device, and providing the multimodal application (195) to the multimodal client (101). Data communication between the multimodal client (101) and the application server application (130) is implemented using, for example, a HyperText Transfer Protocol ('HTTP') connection (206).

In the example of FIG. 2, the application server (147) also has installed upon it a multimodal adapter (132). The multimodal adapter (132) of FIG. 2 is a software component that brokers access to modality web services to provide web service support for a multimodal client processing a multimodal application according to embodiments of the present invention. The multimodal adapter (132) of FIG. 2 operates generally to provide web service support for a multimodal client processing a multimodal application according to embodiments of the present invention by determining modality requirements for the multimodal application (195), selecting a particular modality web service (102) in dependence upon the modality requirements and the characteristics for the multimodal device, including retrieving an interface descriptor for the particular modality web service (102), determining whether the multimodal device supports Voice Over Internet Protocol ('VoIP') in dependence upon the characteristics for the multimodal device, and providing, to the multimodal client (101) in dependence upon whether the multimodal device (152) supports VoIP, access to the particular modality web service (102) for processing the multimodal application (195). The modality requirements determined by the multimodal adapter (132) for the multimodal application (195) specify characteristics of a modality web service capable of processing multimodal applications. For example, a multimodal adapter may identify a VoiceXML markup in a particular multimodal application and determine that such a multimodal application requires a modality web service capable of processing VoiceXML markup. Further consider that the multimodal application may specify a VoiceXML style sheet that specifies text-to-speech synthesis using the voice of Mickey Mouse. A multimodal adapter may determine that such a multimodal application requires a modality web service capable of processing VoiceXML markup using the voice of Mickey Mouse for speech synthesis.

In the example of FIG. 2, the multimodal adapter (132) may retrieves an interface descriptor for the particular modality web service (102) by requesting the interface descriptor for the particular modality web service (102) from a modality locator web service (136). An interface descriptor describes the interface used to communicate with a web service such as, for example, the structure of the messages the web service sends and receives, the protocols used to communicate the messages, where to access the web service, and so on. An interface descriptor may be implemented using the Web Services Description Language ('WSDL'). The Web Services Description Language is an XML-based language that provides a model for describing Web services. The data communication connection between the multimodal adapter (132) and the modality locator web service (136) may be implemented using, for example, a SOAP connection (218). SOAP is a protocol for exchanging XML-based messages over computer networks, normally using HTTP. SOAP forms the foundation layer of the web services stack, providing a basic messaging framework that more abstract layers can build on. A SOAP connection as referred to in this specification is an HTTP connection used to transmit SOAP message. To access the modality locator web service (136), the multimodal adapter (132) may maintain the interface descriptor for the modality locator web service (136) locally on the application server (147).

The exemplary system of FIG. 2 includes a web service locator server (135) that has installed upon it a locator application (138). The locator application (138) of FIG. 2 is a software component that provides the modality locator web service (136) capable of providing an interface descriptor for a modality web service that satisfies certain criteria specified in an interface request. Using the criteria specified in the interface request from the multimodal adapter (132), the modality locator web service (136) may lookup an interface descriptor that satisfies the provided criteria in a database (222). The locator application (138) may access the database (122) through an API specified by, for example, the Open Database Connectivity ('ODBC') or Java Database Connectivity ('JDBC') standards. The database (122) may also be implemented as a Universal Description Discovery and Integration ('UDDI') database made available to the modality locator web service (136) using standard web service messaging technology.

As mentioned above, the multimodal adapter (132) in the example of FIG. 2 determines that the multimodal device (152) supports VoIP. The multimodal adapter (132) may make such a determination using the device characteristics included in the application request provided to the application server (147). Typically, a determination that the multimodal device (152) supports VoIP indicates that the multimodal device (152) has installed upon it a VoIP subsystem capable of implementing a VoIP connection using VoIP protocols, such as, for example, SIP and RTP. In the example of FIG. 2, the multimodal device (152) does, in fact, have installed upon it a VoIP subsystem (202) that exposes an API (203) to the multimodal client (101). When the multimodal adapter (132) of FIG. 2 determines that the multimodal device (152) supports VoIP, the multimodal adapter (132) may provide the multimodal client (101) with access to the particular modality web service (102) by obtaining data communication endpoint information of the particular modality web service (102) in dependence upon the interface descriptor retrieved from the modality locator web service (136), and providing the data communication endpoint information to the multimodal client (101) for direct access to the particular modality web service (102).

Using the interface descriptor, the multimodal adapter (132) obtains data communication endpoint information of the particular modality web service (102) in the example of FIG. 2 through a SOAP connection (216) between the multimodal adapter (132) and the modality web service (102). The data communication endpoint information obtained specifies information about the modality web service (102) used to establish a VoIP connection through which voice services are provided by the modality web service (102). Such data communication endpoint information may include, for example, the IP address of the voice server (151), the port for the voice server application (188) used for VoIP communication, session information, security data, and other information as will occur to those of skill in the art.

After obtaining the data communication endpoint information of the particular modality web service (102), the multimodal adapter (132) of FIG. 2 provides the data communication endpoint information to the multimodal client (101) for direct access to the particular modality web service (102). The multimodal adapter (132) may provide the data communication endpoint information to the multimodal client (101) along with the multimodal application (195) in a response to the multimodal client's (101) application request. The multimodal client (101) may then provide the data communication endpoint information to the VoIP subsystem (202) installed on the multimodal device (152), which in turn establishes a VoIP connection (204) with the modality web service (102) to provide voice services as the multimodal client (101) processes the multimodal application (195).

From the perspective of the multimodal client (101), the multimodal client (101) of FIG. 2 transmits the application request to the application server (147). The application request specifies the multimodal application (195) using, for example, a URI, and characteristics for the multimodal device (152) that may include, for example, an indication of whether the multimodal device has installed upon it a VoIP subsystem. In response to the application request, the multimodal client (101) of FIG. 2 receives the multimodal application (195) from the application server (147) and receives access to the particular modality web service (102) from application server (147). The multimodal client (101) of FIG. 2 executes the multimodal application (195) using the particular modality web service (102), including providing to the particular modality web service (102) for processing the portions of the multimodal application (195) that correspond to a particular mode of user interaction capable of being processed by the particular modality web service (102). In the example of FIG. 2, the multimodal client (101) provides VoiceXML voice dialog instructions to the modality web service (102) for voice processing.

In the example of FIG. 2, the modality web service (102) is implemented using a voice server (151) having installed upon it a voice server application (188), a VoiceXML interpreter (192), a Java Virtual Machine (210), a SALT interpreter (211), and a speech engine (153). The voice server application (188) processes voice service requests received through the VoIP connection (204) by passing the speech for recognition, grammars, text for speech synthesis, and other input to the speech engine (153) through the VoiceXML interpreter (192), the SALT interpreter (211), or the Java Virtual Machine (210) depending on the whether the multimodal application (195) is implemented using X+V, SALT, or as a Java speech application. The voice server application (188) then provides responses to the voice service requests by passing the text, semantic interpretation results, synthesized speech, and other speech engine (153) output directly to the multimodal client (101) through the VoIP connection (204).

The exemplary system of FIG. 2 also includes a multimodal interface server (141) having installed upon it an interface application (142). The interface application (142) of FIG. 2 is a software component that provides a multimodal shell web service (140) capable of providing a multimodal client with a customized user interface. The multimodal shell web service (140) of FIG. 2 provides web service support for a multimodal client processing a multimodal application according to embodiments of the present invention. The multimodal shell web service (140) receives a multimodal interface request from the multimodal client that specifies user data for a user of the multimodal device and attributes of the multimodal device. The user data that is included in the multimodal interface request is data that describes a user of the multimodal device (152). For example, user data may include a user identifier, a user profile, or any other data describing a user of the multimodal device. Attributes of the multimodal device describe the multimodal device itself and the software installed on the multimodal device. For example, attribute of the multimodal device may include a device identifier, display type for the device, information indicating whether the device supports JavaScript, the version of the multimodal browser installed on the device, the types of codecs supported by the device, or any other information describing the multimodal device as will occur to those of skill in the art. Using the user data and the attributes for the multimodal device, the multimodal shell web service (140) of FIG. 2 configures a customized multimodal interface for the multimodal client (101) operating on the multimodal device (152) and provides the multimodal interface to the multimodal client (101). The data communication between the multimodal client (101) and the multimodal shell web service (140) may be implemented using, for example, a SOAP connection (214).

From the perspective of the multimodal device, the multimodal client (101) of FIG. 2 transmits a multimodal interface request to a multimodal shell web service (102). The multimodal interface request specifies user data for a user of the multimodal device (152) and attributes of the multimodal device (152) itself. In response to the user interface request, the multimodal client (101) of FIG. 2 receives a multimodal user interface from the multimodal shell web service (140) and renders the multimodal user interface to a user.

As mentioned above, if a multimodal adapter of an application server determines that a multimodal device does not support VoIP, the multimodal adapter may provide access to a particular modality web service by providing the multimodal adapter's data communication endpoint information to a multimodal client for indirect access to the particular modality web service through an application server on which the multimodal adapter is installed. For further explanation, FIG. 3 sets forth a block diagram of a further exemplary system configured to provide web service support for a multimodal client (101) processing a multimodal application (195) according to embodiments of the present invention in which a multimodal adapter (132) of an application server (147) determines that a multimodal device (152) does not support VoIP.

Figure 3:
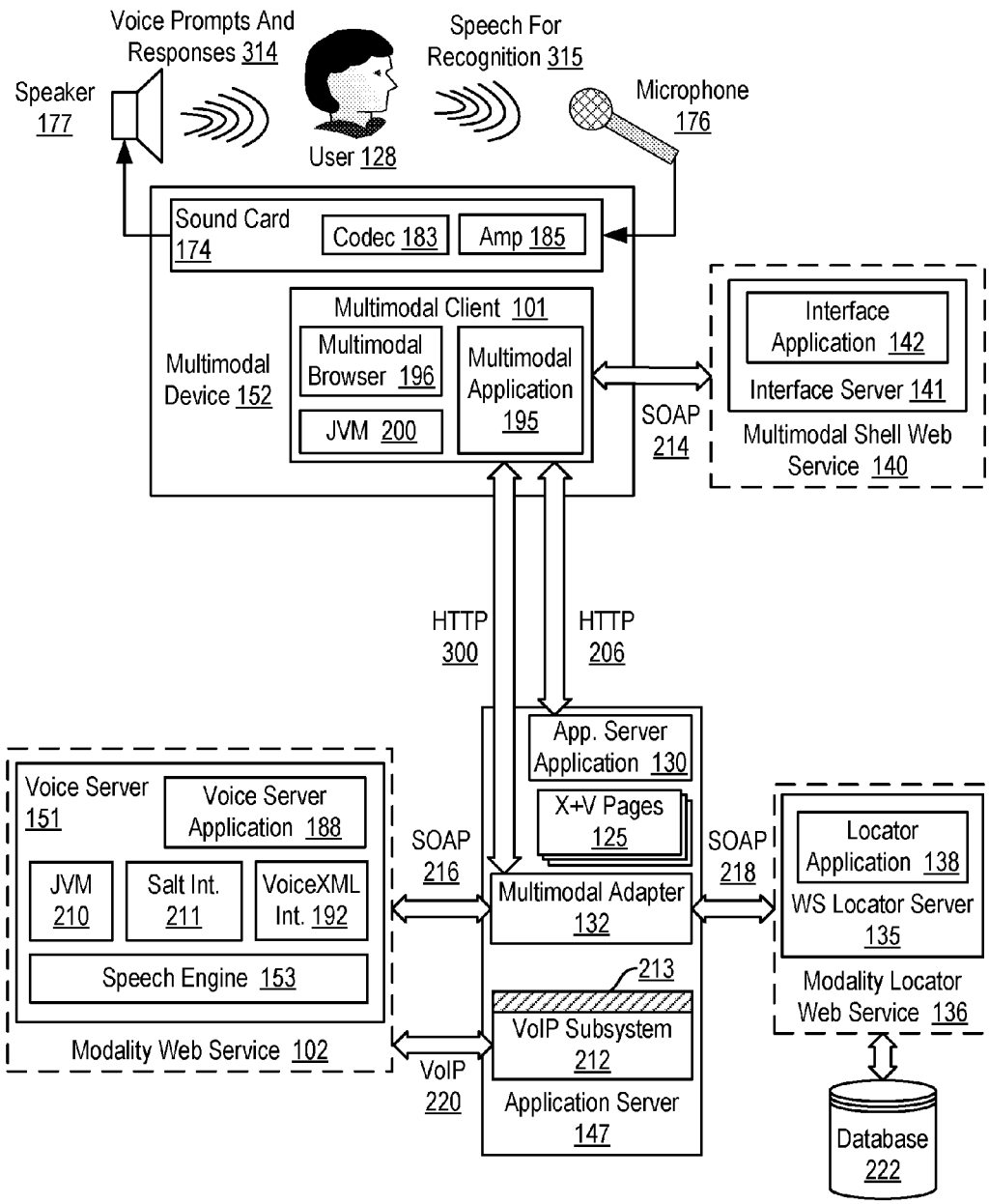
FIG. 3 sets forth a block diagram of a further exemplary system configured to provide web service support for a multimodal client processing a multimodal application according to embodiments of the present invention.

The exemplary system of FIG. 3 is similar to the exemplary system of FIG. 2. The exemplary system of FIG. 3 includes a multimodal device (152) that provides playback of voice prompts and responses (314) using speaker (177) and accepts audio input of speech for recognition (315) through microphone (176). The speech for recognition (315) is then digitized through an audio amplifier (185) and a coder/decoder ('codec') (183) of a sound card (174). The multimodal device (152) has installed upon it a multimodal client (101) that provides an execution environment for the multimodal application (195). The multimodal client (101) of FIG. 3 may be implemented as a multimodal browser (196) when the multimodal application (195) is implemented using X+V or SALT or may be implemented as a Java Virtual Machine (200) when the multimodal application (195) is implemented as a Java speech application.

The exemplary system of FIG. 3 also includes an application server (147) that provides multimodal applications to multimodal clients installed on multimodal devices. The application server (147) of FIG. 3 also brokers access to modality web services capable of processing portions of a multimodal application that correspond to particular modalities. The application server (147) has installed upon it an application server application (130). The application server application (130) of FIG. 3 is a software component capable of operating the application server (147) for web service support for a multimodal client processing a multimodal application according to embodiments of the present invention. The application server application (130) of FIG. 3 operates generally to provide web service support for a multimodal client processing a multimodal application according to embodiments of the present invention by receiving an application request from the multimodal client that specifies the multimodal application requested and characteristics for the multimodal device, and providing the multimodal application (195) to the multimodal client (101). Data communication between the multimodal client (101) and the application server application (130) is implemented using, for example, a HyperText Transfer Protocol ('HTTP') connection (206).

In the example of FIG. 3, the application server (147) also has installed upon it a multimodal adapter (132). The multimodal adapter (132) of FIG. 3 is a software component that brokers access to modality web services to provide web service support for a multimodal client processing a multimodal application according to embodiments of the present invention. The multimodal adapter (132) of FIG. 3 operates generally to provide web service support for a multimodal client processing a multimodal application according to embodiments of the present invention by determining modality requirements for the multimodal application (195), selecting a particular modality web service (102) in dependence upon the modality requirements and the characteristics for the multimodal device, including retrieving an interface descriptor for the particular modality web service (102), determining whether the multimodal device supports Voice Over Internet Protocol ('VoIP') in dependence upon the characteristics for the multimodal device, and providing, to the multimodal client (101) in dependence upon whether the multimodal device (152) supports VoIP, access to the particular modality web service (102) for processing the multimodal application (195). The modality requirements determined by the multimodal adapter (132) for the multimodal application (195) specify characteristics of a modality web service capable of processing multimodal applications. For example, a multimodal adapter may identify a VoiceXML markup in a particular multimodal application and determine that such a multimodal application requires a modality web service capable of processing VoiceXML markup. Further consider that the multimodal application may specify a VoiceXML style sheet that specifies text-to-speech synthesis using the voice of Mickey Mouse. A multimodal adapter may determine that such a multimodal application requires a modality web service capable of processing VoiceXML markup using the voice of Mickey Mouse for speech synthesis.

In the example of FIG. 3, the multimodal adapter (132) may retrieves an interface descriptor for the particular modality web service (102) by requesting the interface descriptor for the particular modality web service (102) from a modality locator web service (136). An interface descriptor describes the interface used to communicate with a web service such as, for example, the structure of the messages the web service sends and receives, the protocols used to communicate the messages, where to access the web service, and so on. An interface descriptor may be implemented using the Web Services Description Language. The data communication connection between the multimodal adapter (132) and the modality locator web service (136) may be implemented using, for example, a SOAP connection (218). To access the modality locator web service (136), the multimodal adapter (132) may maintain the interface descriptor for the modality locator web service (136) locally on the application server (147).

The exemplary system of FIG. 3 includes a web service locator server (135) that has installed upon it a locator application (138). The locator application (138) of FIG. 3 is a software component that provides the modality locator web service (136) capable of providing an interface descriptor for a modality web service that satisfies certain criteria specified in an interface request. Using the criteria specified in the interface request from the multimodal adapter (132), the modality locator web service (136) may lookup an interface descriptor that satisfies the provided criteria in a database (222).

As mentioned above, the multimodal adapter (132) in the example of FIG. 3 determines that the multimodal device (152) does not support VoIP. The multimodal adapter (132) may make such a determination using the device characteristics included in the application request provided to the application server (147). Typically, a determination that the multimodal device (152) does not support VoIP indicates that the multimodal device (152) does not have installed upon it a VoIP subsystem capable of implementing a VoIP connection using VoIP protocols, such as, for example, SIP and RTP. In the example of FIG. 3, the multimodal device (152), in fact, does not have installed upon it a VoIP subsystem. When the multimodal adapter (132) of FIG. 3 determines that the multimodal device (152) does not support VoIP, the multimodal adapter (132) may provide the multimodal client (101) with access to the particular modality web service (102) by obtaining data communication endpoint information of the particular modality web service (102) in dependence upon the interface descriptor retrieved from the modality locator web service (136), and providing data communication endpoint information of the multimodal adapter (132) to the multimodal client (101) for indirect access to the particular modality web service (102) through the application server (147).

Using the interface descriptor, the multimodal adapter (132) obtains data communication endpoint information of the particular modality web service (102) in the example of FIG. 3 through a SOAP connection (216) between the multimodal adapter (132) and the modality web service (102). The data communication endpoint information obtained specifies information about the modality web service (102) used to establish a VoIP connection through which voice services are provided by the modality web service (102). Such data communication endpoint information may include, for example, the IP address of the voice server (151), the port for the voice server application (188) used for VoIP communication, session information, security data, and other information as will occur to those of skill in the art.

After obtaining the data communication endpoint information of the particular modality web service (102), the multimodal adapter (132) of FIG. 3 provides the modality web service's (102) data communication endpoint information to a VoIP subsystem (212) through API (213) to establish VoIP connection (220) with the modality web service (102). The multimodal adapter (132) then provides data communication endpoint information of the multimodal adapter (132) to the multimodal client (101) for indirect access to the particular modality web service (102) through the application server (147). The multimodal adapter (132) may provide the multimodal adapter's (132) data communication endpoint information to the multimodal client (101) along with the multimodal application (195) in a response to the multimodal client's (101) application request.

Using the multimodal adapter's (132) data communication endpoint information, the multimodal client (101) establishes an HTTP connection (300) with the multimodal adapter (132). The multimodal client (101) then provides voice service requests to the multimodal adapter (132) through the HTTP connection (300). The multimodal adapter (132) repackages the voice service requests for transmission to the modality web service (102) through the VoIP connection (220) established by the VoIP subsystem (212). After the modality web service (102) processes the voice service requests, the multimodal adapter (132) receives the results through the VoIP connection (220) from the modality web service (102), and repackages the results for transmission to the multimodal client (101) through the HTTP connection (300). In such an embodiment, the multimodal adapter (132) operates as an intermediary for communication between the multimodal client (101) and the modality web service (102) when the multimodal device does not support VoIP.

From the perspective of the multimodal client (101), the multimodal client (101) of FIG. 3 transmits the application request to the application server (147). The application request specifies the multimodal application (195) using, for example, a URI, and characteristics for the multimodal device (152) that may include, for example, an indication of whether the multimodal device has installed upon it a VoIP subsystem. In response to the application request, the multimodal client (101) of FIG. 3 receives the multimodal application (195) from the application server (147) and receives access to the particular modality web service (102) from application server (147). The multimodal client (101) of FIG. 3 executes the multimodal application (195) using the particular modality web service (102), including providing to the particular modality web service (102) for processing the portions of the multimodal application (195) that correspond to a particular mode of user interaction capable of being processed by the particular modality web service (102). In the example of FIG. 3, the multimodal client (101) provides VoiceXML voice dialog instructions to the modality web service (102) for voice processing.

In the example of FIG. 3, the modality web service (102) is implemented using a voice server (151) having installed upon it a voice server application (188), a VoiceXML interpreter (192), a Java Virtual Machine (210), a SALT interpreter (211), and a speech engine (153). The voice server application (188) processes voice service requests received through the VoIP connection (220) by passing the speech for recognition, grammars, text for speech synthesis, and other input to the speech engine (153) through the VoiceXML interpreter (192), the SALT interpreter (211), or the Java Virtual Machine (210) depending on the whether the multimodal application (195) is implemented using X+V, SALT, or as a Java speech application. The voice server application (188) then provides responses to the voice service requests by passing the text, semantic interpretation results, synthesized speech, and other speech engine (153) output indirectly to the multimodal client (101) through the VoIP connection (220) and application server (147).

Similar to the exemplary system of FIG. 2, the exemplary system of FIG. 3 also includes a multimodal interface server (141) having installed upon it an interface application (142). The interface application (142) of FIG. 3 is a software component that provides a multimodal shell web service (140) capable of providing a multimodal client with a customized user interface. The multimodal shell web service (140) of FIG. 3 provides web service support for a multimodal client processing a multimodal application according to embodiments of the present invention. The multimodal shell web service (140) receives a multimodal interface request from the multimodal client that specifies user data for a user of the multimodal device and attributes of the multimodal device. The user data that is included in the multimodal interface request is data that describes a user of the multimodal device (152). Attributes of the multimodal device describe the multimodal device itself and the software installed on the multimodal device. Using the user data and the attributes for the multimodal device, the multimodal shell web service (140) of FIG. 3 configures a customized multimodal interface for the multimodal client (101) operating on the multimodal device (152) and provides the multimodal interface to the multimodal client (101). The data communication between the multimodal client (101) and the multimodal shell web service (140) may be implemented using, for example, a SOAP connection (214).

From the perspective of the multimodal device, the multimodal client (101) of FIG. 3 transmits a multimodal interface request to a multimodal shell web service (102). The multimodal interface request specifies user data for a user of the multimodal device (152) and attributes of the multimodal device (152) itself. In response to the user interface request, the multimodal client (101) of FIG. 3 receives a multimodal user interface from the multimodal shell web service (140) and renders the multimodal user interface to a user.

Web service support for a multimodal client processing a multimodal application according to embodiments of the present invention may be implemented with one or more computers operating as application servers, multimodal devices, voice servers, web service locator servers, interface servers, and so on. For further explanation, therefore, FIG. 4 sets forth a block diagram of automated computing machinery comprising an example of a computer useful as an application server in web service support for a multimodal client processing a multimodal application according to embodiments of the present invention. The application server (147) of FIG. 4 includes at least one computer processor (156) or 'CPU' as well as random access memory (168) ('RAM') which is connected through a high speed memory bus (166) and bus adapter (158) to processor (156) and to other components of the application server (147).

Stored in RAM (168) are an application server application (130), X+V pages (125), multimodal adapter (132), and VoIP subsystem (212). The X+V pages (125) are markup language documents conforming to X+V that composes one or more multimodal applications. The application server application (130), multimodal adapter (132), and VoIP subsystem (212) is similar to and operates in the same manner as the application server application (130), multimodal adapter (132), and VoIP subsystem (212) described above with reference to FIGS. 1, 2, and 3.

Also stored in RAM (168) is an operating system (154). Operating systems useful in voice servers according to embodiments of the present invention include UNIX™, Linux™, Microsoft NT™, IBM's AIX™, IBM's i5/OS™, and others as will occur to those of skill in the art. Operating system (154), application server application (130), X+V pages (125), multimodal adapter (132), and VoIP subsystem (212) in the example of FIG. 4 are shown in RAM (168), but many components of such software typically are stored in non-volatile memory also, for example, on a disk drive (170).

Figure 4:
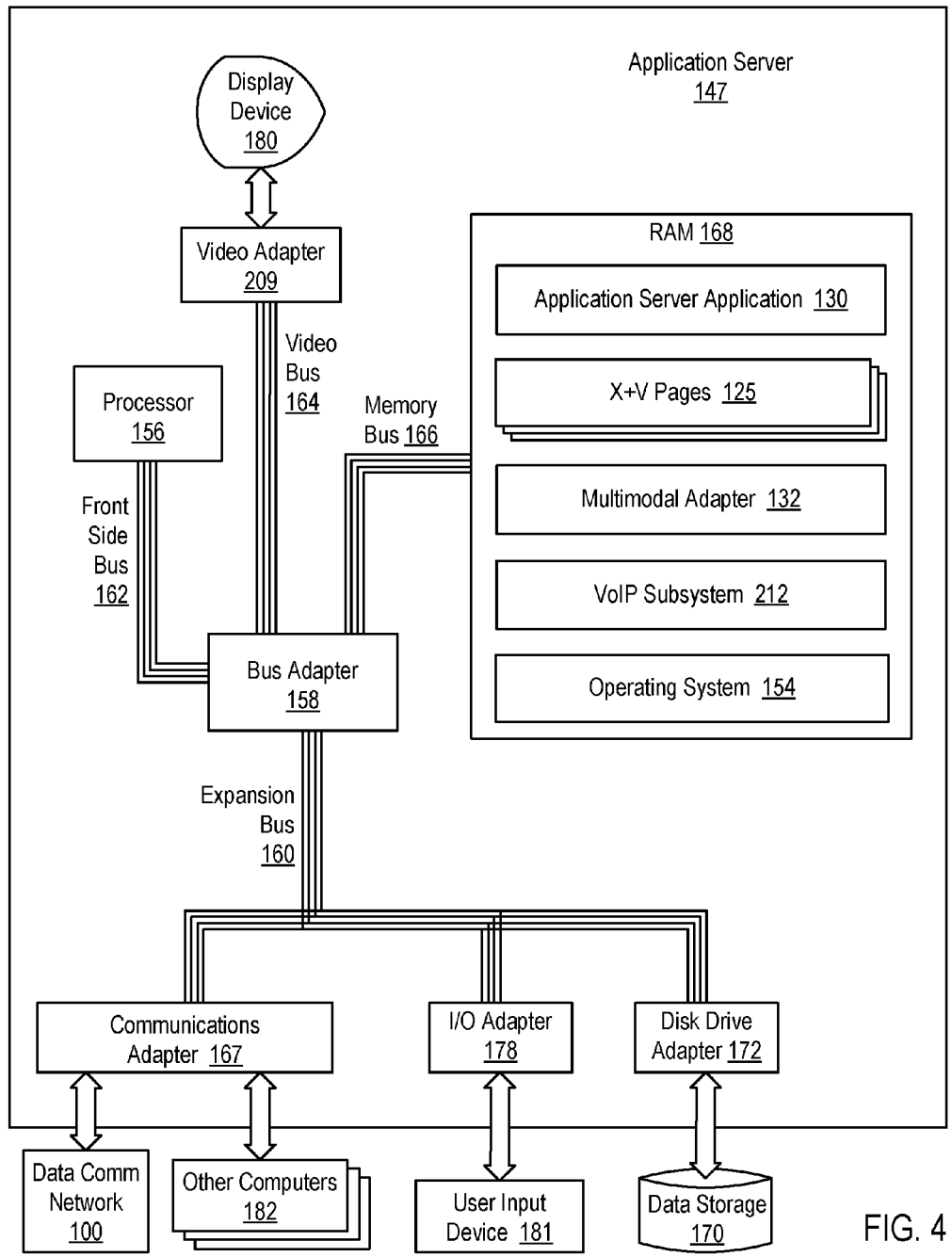
FIG. 4 sets forth a block diagram of automated computing machinery comprising an example of a computer useful as an application server in web service support for a multimodal client processing a multimodal application according to embodiments of the present invention.

Application server (147) of FIG. 4 includes bus adapter (158), a computer hardware component that contains drive electronics for high speed buses, the front side bus (162), the video bus (164), and the memory bus (166), as well as drive electronics for the slower expansion bus (160). Examples of bus adapters useful in application servers according to embodiments of the present invention include the Intel Northbridge, the Intel Memory Controller Hub, the Intel Southbridge, and the Intel I/O Controller Hub. Examples of expansion buses useful in application servers according to embodiments of the present invention include Peripheral Component Interconnect ('PCI') buses and PCI Express ('PCIe') buses.

Application server (147) of FIG. 4 includes disk drive adapter (172) coupled through expansion bus (160) and bus adapter (158) to processor (156) and other components of the application server (147). Disk drive adapter (172) connects non-volatile data storage to the application server (147) in the form of disk drive (170). Disk drive adapters useful in application servers include Integrated Drive Electronics ('IDE') adapters, Small Computer System Interface ('SCSI') adapters, and others as will occur to those of skill in the art. In addition, non-volatile computer memory may be implemented for a application server as an optical disk drive, electrically erasable programmable read-only memory (so-called 'EEPROM' or 'Flash' memory), RAM drives, and so on, as will occur to those of skill in the art.

The example application server of FIG. 4 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example application server of FIG. 4 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary application server (147) of FIG. 4 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for web service support for a multimodal client processing a multimodal application according to embodiments of the present invention include modems for wired dial-up communications, Ethernet (IEEE 802.3) adapters for wired data communications network communications, and 802.11 adapters for wireless data communications network communications.

Figure 5:
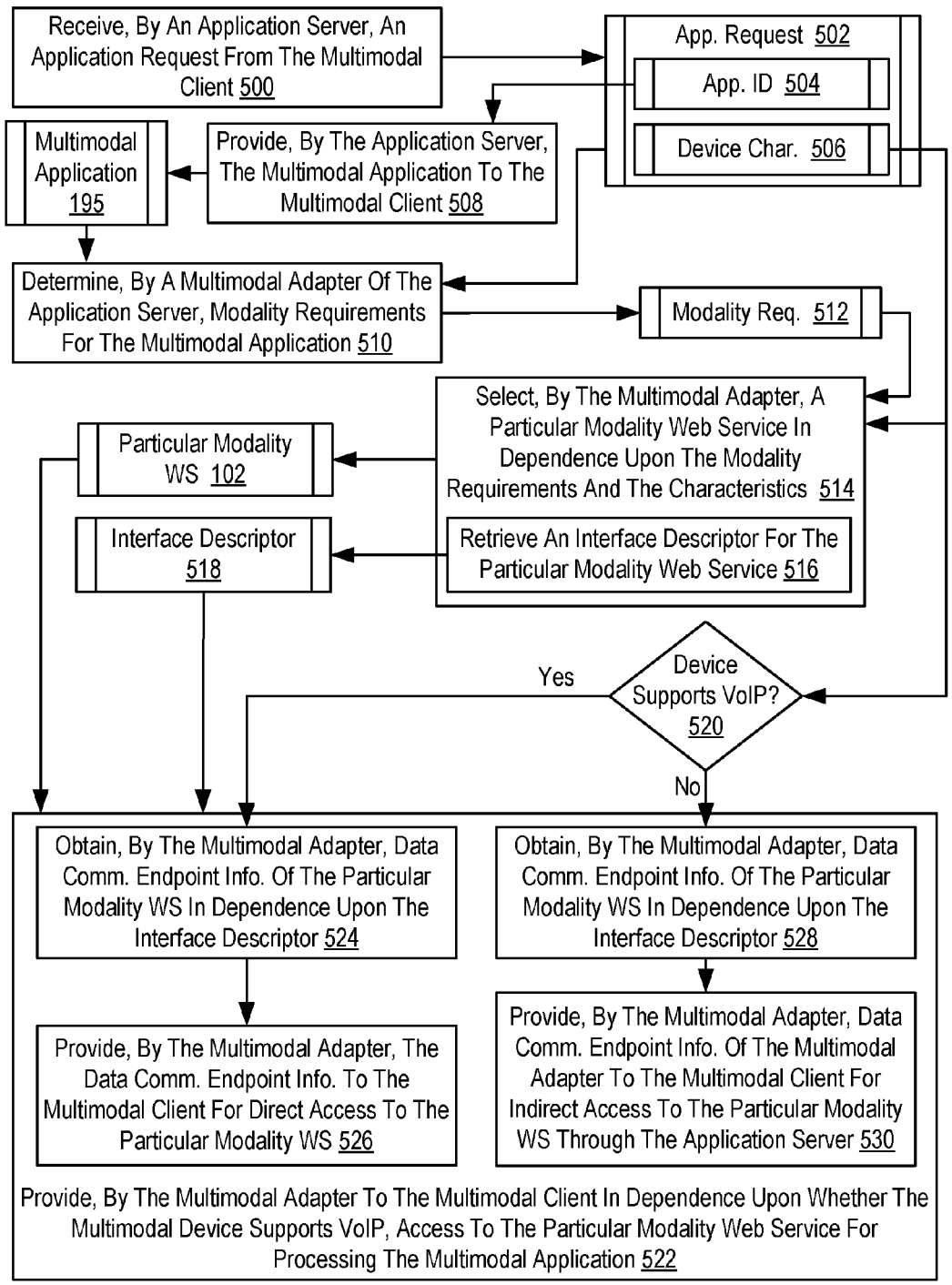
FIG. 5 sets forth a flow chart illustrating an exemplary method of web service support for a multimodal client processing a multimodal application according to embodiments of the present invention.

For further explanation, FIG. 5 sets forth a flow chart illustrating an exemplary method of web service support for a multimodal client processing a multimodal application according to embodiments of the present invention. The multimodal client described in FIG. 5 provides an execution environment for the multimodal application. In the example of FIG. 5, the multimodal client operates on a multimodal device supporting multiple modes of user interaction including a voice mode and one or more non-voice modes. The multimodal application is stored on an application server operatively connected to the multimodal device through a data communications network.

The method of FIG. 5 includes receiving (500), by the application server, an application request (502) from the multimodal client. The application server may receive (500) an application request (502) from the multimodal client according to the method of FIG. 5 through a data communication connection implemented according to Hypertext Transfer Protocol. The application request (502) of FIG. 5 specifies the multimodal application using an application identifier (504). The application identifier (504) of FIG. 5 may be implemented using, for example, a Uniform Resource Identifier. The application request (502) of FIG. 5 also specifies characteristics (506) for the multimodal device. The characteristics (506) for the multimodal device included in the application request (502) provide the application server with information about the multimodal device used in selecting a modality web service that appropriately supports the multimodal client in processing the multimodal application according to embodiments of the present invention. The characteristics (506) included in the message request may include, for example, data communications capabilities of the device, codecs supported by the device, language settings for the device, and any other device characteristics as will occur to those of skill in the art.

The method of FIG. 5 also includes providing (508), by the application server, the multimodal application (195) to the multimodal client. The application server may provide (508) the multimodal application (195) to the multimodal client according to the method of FIG. 5 by retrieving the multimodal application (195) from a set of X+V pages based on the application identifier (504), encapsulating the multimodal application into an HTTP message, transmitting the HTTP message to the multimodal client in response to the application request (502).

The method of FIG. 5 includes determining (510), by a multimodal adapter of the application server, modality requirements (512) for the multimodal application (195). The modality requirements (512) of FIG. 5 represent a set of data that specifies characteristics of a modality web service capable of processing portions of the multimodal application (195). The multimodal adapter may determine (510) the modality requirements (512) for the multimodal application (195) according to the method of FIG. 5 by parsing the multimodal application (195) to identify processing specifications contained in the multimodal application (195). For example, a multimodal adapter may identify a VoiceXML markup in a particular multimodal application and determine that such a multimodal application requires a modality web service capable of processing VoiceXML markup. Further consider that the multimodal application may specify a VoiceXML style sheet that specifies text-to-speech synthesis using the voice of Mickey Mouse. A multimodal adapter may determine that such a multimodal application requires a modality web service capable of processing VoiceXML markup using the voice of Mickey Mouse for speech synthesis.

The method of FIG. 5 also includes selecting (514), by the multimodal adapter of the application server, a particular modality web service (102) in dependence upon the modality requirements (512) and the characteristics (506) for the multimodal device. Selecting (514), by the multimodal adapter of the application server, a particular modality web service (102) according to the method of FIG. 5 includes retrieving (516) an interface descriptor (518) for the particular modality web service (102). An interface descriptor describes the interface used to communicate with a web service such as, for example, the structure of the messages the web service sends and receives, the protocols used to communicate the messages, where to access the web service, and so on. An interface descriptor may be implemented using the Web Services Description Language.

In the method of FIG. 5, the multimodal adapter may retrieve (516) an interface descriptor (518) for the particular modality web service (102) using a local database accessible to the multimodal adapter through, for example, an API specified by ODBC or JDBC standards. The multimodal adapter may also retrieve (516) an interface descriptor (518) for the particular modality web service (102) according to the method of FIG. 5 by requesting the interface descriptor (518) for the particular modality web service (102) from a modality locator web service. Regardless of whether the multimodal adapter retrieves (516) the interface descriptor (518) for the particular modality web service (102) from a local database or the modality locator web service, in the example of FIG. 5, the interface descriptor (518) enables the multimodal adapter to communicate with the particular modality web service (102).

The modality locator web service is a web service capable of providing an interface descriptor for a modality web service that satisfies certain criteria specified in an interface request. Using the criteria specified in the interface request from the multimodal adapter, the modality locator web service may lookup an interface descriptor that satisfies the provided criteria in a database. The modality locator web service may access the database through an API specified by, for example, ODBC or JDBC standards. The database may also be implemented as a UDDI database made available to the modality locator web service using standard web service messaging technology. To request the interface descriptor (518) for the particular modality web service (102) from a modality locator web service, the multimodal adapter must typically already have the modality locator web service's interface descriptor. The multimodal adapter may maintain the interface descriptor for the modality locator web service locally on the application server.

The method of FIG. 5 includes determining (520), by the multimodal adapter of the application server, whether the multimodal device supports Voice Over Internet Protocol in dependence upon the characteristics (506) for the multimodal device. The multimodal adapter may determine (520) whether the multimodal device supports VoIP according to the method of FIG. 5 by identifying, from the device characteristics (506) whether the multimodal device has installed upon it a VoIP subsystem capable of establishing a VoIP connection using VoIP protocols such as, for example, SIP or RTP. If the device characteristics indicate that the multimodal device has installed upon it a VoIP subsystem, then the multimodal adapter may determine that the multimodal device supports VoIP. If the device characteristics indicate that the multimodal device does not have installed upon it a VoIP subsystem, then the multimodal adapter may determine that the multimodal device does not support VoIP.

The method of FIG. 5 also includes providing (522), by the multimodal adapter of the application server to the multimodal client in dependence upon whether the multimodal device supports VoIP, access to the particular modality web service (102) for processing the multimodal application (195). When the multimodal adapter determines that the multimodal device supports VoIP, the multimodal adapter may provide (522) access to the particular modality web service (102) according to the method of FIG. 5 by obtaining (524) data communication endpoint information of the particular modality web service (102) in dependence upon the interface descriptor (518) and providing (526) the data communication endpoint information to the multimodal client for direct access to the particular modality web service (102). The multimodal adapter may obtain (524) data communication endpoint information of the particular modality web service (102) in dependence upon the interface descriptor (518) according to the method of FIG. 5 by creating a data communication endpoint request message as specified by the interface descriptor (518) for the modality web service (102), transmitting the data communication endpoint request message to the modality web service (102) through a SOAP connection specified in the interface descriptor (518), and receiving, in return, the data communication endpoint information in a response message as specified by the interface descriptor (518). The multimodal adapter may provide (526) the data communication endpoint information to the multimodal client for direct access to the particular modality web service (102) according to the method of FIG. 5 by encapsulating the modality web service's (102) data communication endpoint information along with the multimodal application (195) in an HTTP message, and transmitting the HTTP message back to the multimodal client in response to the application request (502).

When the multimodal adapter determines that the multimodal device does not support VoIP, the multimodal adapter may provide (522) access to the particular modality web service (102) according to the method of FIG. 5 by obtaining (528), by the multimodal adapter, data communication endpoint information of the particular modality web service (102) in dependence upon the interface descriptor (518), and providing (530), by the multimodal adapter, data communication endpoint information of the multimodal adapter to the multimodal client for indirect access to the particular modality web service (102) through the application server. The multimodal adapter may obtain (528) data communication endpoint information of the particular modality web service (102) in dependence upon the interface descriptor (518) according to the method of FIG. 5 by creating a data communication endpoint request message as specified by the interface descriptor (518) for the modality web service (102), transmitting the data communication endpoint request message to the modality web service (102) through a SOAP connection specified in the interface descriptor (518), and receiving, in return, the data communication endpoint information in a response message as specified by the interface descriptor (518). The multimodal adapter may provide (530) data communication endpoint information of the multimodal adapter to the multimodal client for indirect access to the particular modality web service (102) through the application server according to the method of FIG. 5 by encapsulating the multimodal adapter's (132) data communication endpoint information along with the multimodal application (195) in an HTTP message, and transmitting the HTTP message back to the multimodal client in response to the application request (502).

Figure 6:
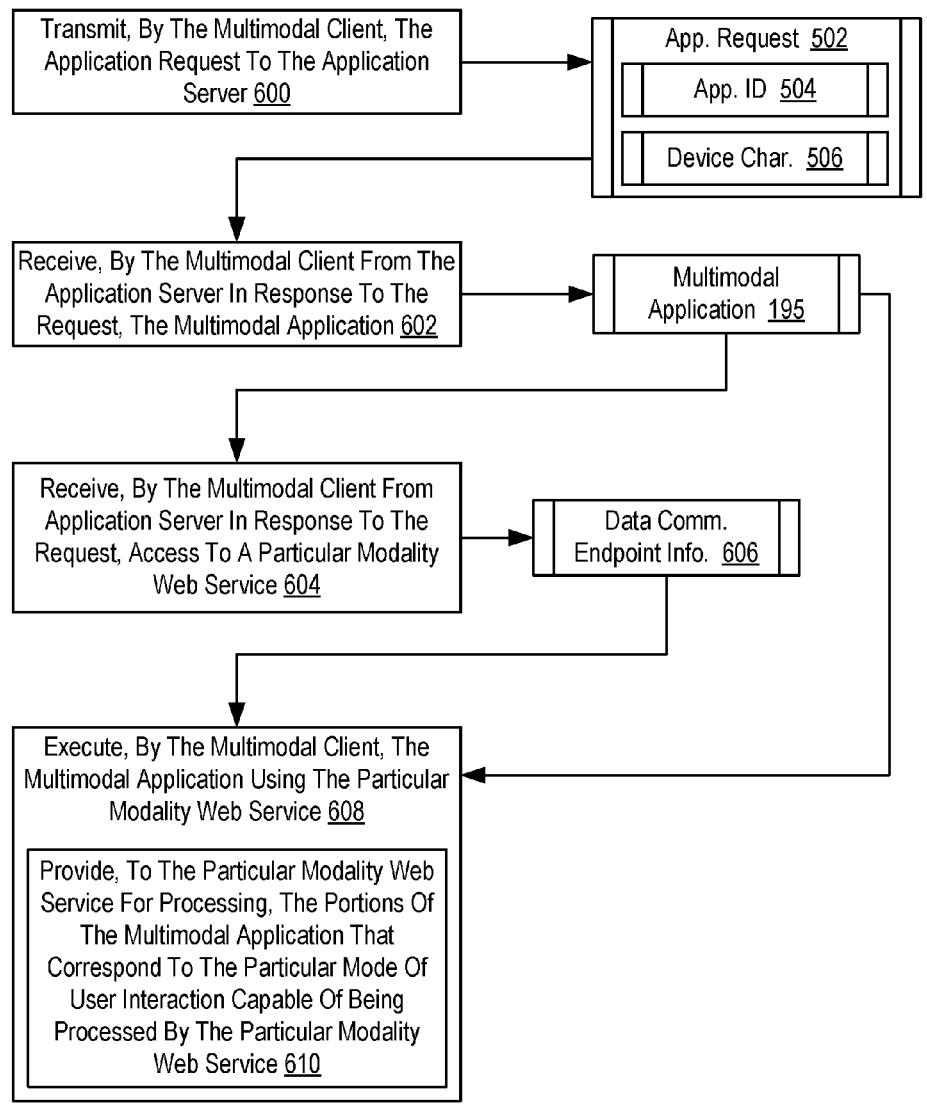
FIG. 6 sets forth a flow chart illustrating a further exemplary method of web service support for a multimodal client processing a multimodal application according to embodiments of the present invention.

Turning now to the perspective from the multimodal client installed on the multimodal device, FIG. 6 sets forth a flow chart illustrating a further exemplary method of web service support for a multimodal client processing a multimodal application according to embodiments of the present invention. The method of FIG. 6 includes transmitting (600), by the multimodal client, the application request (502) to the application server. The multimodal client may transmit (600) the application request (502) to the application server according to the method of FIG. 6 by encapsulating an application identifier (504) and device characteristics (506) into an HTTP request message and transmitting the HTTP request message to the application server according to the Hypertext Transfer Protocol.

In the example of FIG. 6, the application request (502) specifies the multimodal application using an application identifier (504). The application identifier (504) of FIG. 6 may be implemented using, for example, a Uniform Resource Identifier. The application request (502) of FIG. 6 also specifies characteristics (506) for the multimodal device. The characteristics (506) for the multimodal device included in the application request (502) provide the application server with information about the multimodal device used in selecting a modality web service that appropriately supports the multimodal client in processing the multimodal application according to embodiments of the present invention. The characteristics (506) included in the message request may include, for example, data communications capabilities of the device, codecs supported by the device, language settings for the device, and any other device characteristics as will occur to those of skill in the art. As mentioned above, the application server uses the device characteristics (506) to select a particular modality web service capable of processing a multimodal application for the multimodal device.

The method of FIG. 6 includes receiving (602), by the multimodal client from the application server in response to the application request (502), the multimodal application (195). The multimodal client may receive (602) the multimodal application (195) from the application server in response to the application request (502) according to the method of FIG. 6 by accepting an HTTP message transmitted from the application server and unencapsulating the multimodal application from the received HTTP message.

The method of FIG. 6 also includes receiving (604), by the multimodal client from application server in response to the application request (502), access to the particular modality web service. The multimodal client may receive (604) access to a particular modality web service in response to the application request (502) according to the method of FIG. 6 by accepting an HTTP message transmitted from the application server and unencapsulating data communications endpoint information (606) from the received HTTP message. The data communications endpoint information (606) of FIG. 6 may represent data communications endpoint information of a modality web service used to establish a VoIP connection with the modality web service when the device characteristics (506) provided in the application request (502) indicate that the multimodal device supports VoIP. The data communications endpoint information (606) of FIG. 6 may represent data communications endpoint information of a multimodal adapter used to establish an HTTP connection with the multimodal adapter when the device characteristics (506) provided in the application request (502) indicate that the multimodal device does not support VoIP.

The method of FIG. 6 includes executing (608), by the multimodal client, the multimodal application (195) using the particular modality web service. In the method of FIG. 6, the multimodal client executes (608) the multimodal application (195) using the particular modality web service by providing (610), to the particular modality web service for processing, the portions of the multimodal application (195) that correspond to the particular mode of user interaction capable of being processed by the particular modality web service. When the multimodal device supports VoIP, the multimodal client may provide (610) portions of the multimodal application (195) to the particular modality web service for processing according to the method of FIG. 6 by identifying the portions of the multimodal application (195) capable of being processed by the particular modality web service, transmitting those portions directly to the particular modality web service through the VoIP established with the particular web service modality, and receiving the processed results through the direct VoIP connection between the multimodal client and the modality web service. For example, the multimodal client may identify VoiceXML instructions in the multimodal application, provide those instructions along with any other voice input through a VoIP connection to the particular modality service capable of processing the VoiceXML instructions, and receive in return through the VoIP connection recognition results, semantic interpretation results, synthesized speech, and so on.

When the multimodal device does not support VoIP, the multimodal client may provide (610) portions of the multimodal application (195) to the particular modality web service for processing according to the method of FIG. 6 by identifying the portions of the multimodal application (195) capable of being processed by the particular modality web service, transmitting those portions indirectly to the particular modality web service through the application server according to HTTP, and receiving the processed results from the modality web service through the application server using the HTTP connection. For example, the multimodal client may identify VoiceXML instructions in the multimodal application, provide those instructions along with any other voice input to the application server, which in turn passes the instructions along with any other voice input to the modality web service using a VoIP connection. The application server then receives recognition results, semantic interpretation results, synthesized speech, and so on from the modality web service through the VoIP connection, and in turn passes the results back to the multimodal client using an HTTP connection.

The descriptions above with reference to FIGS. 5 and 6 explain how web services may support a multimodal client by providing access to a modality web service for processing the multimodal application. In addition, web services may also support a multimodal client by providing a customized multimodal interface to the multimodal client. For further explanation, therefore, FIG. 7 sets forth a flow chart illustrating a further exemplary method of web service support for a multimodal client processing a multimodal application according to embodiments of the present invention that includes transmitting (700), by the multimodal client, a multimodal interface request (702) to a multimodal shell web service. A multimodal shell web service is a web service capable of providing a multimodal client with a customized user interface.

Figure 7:
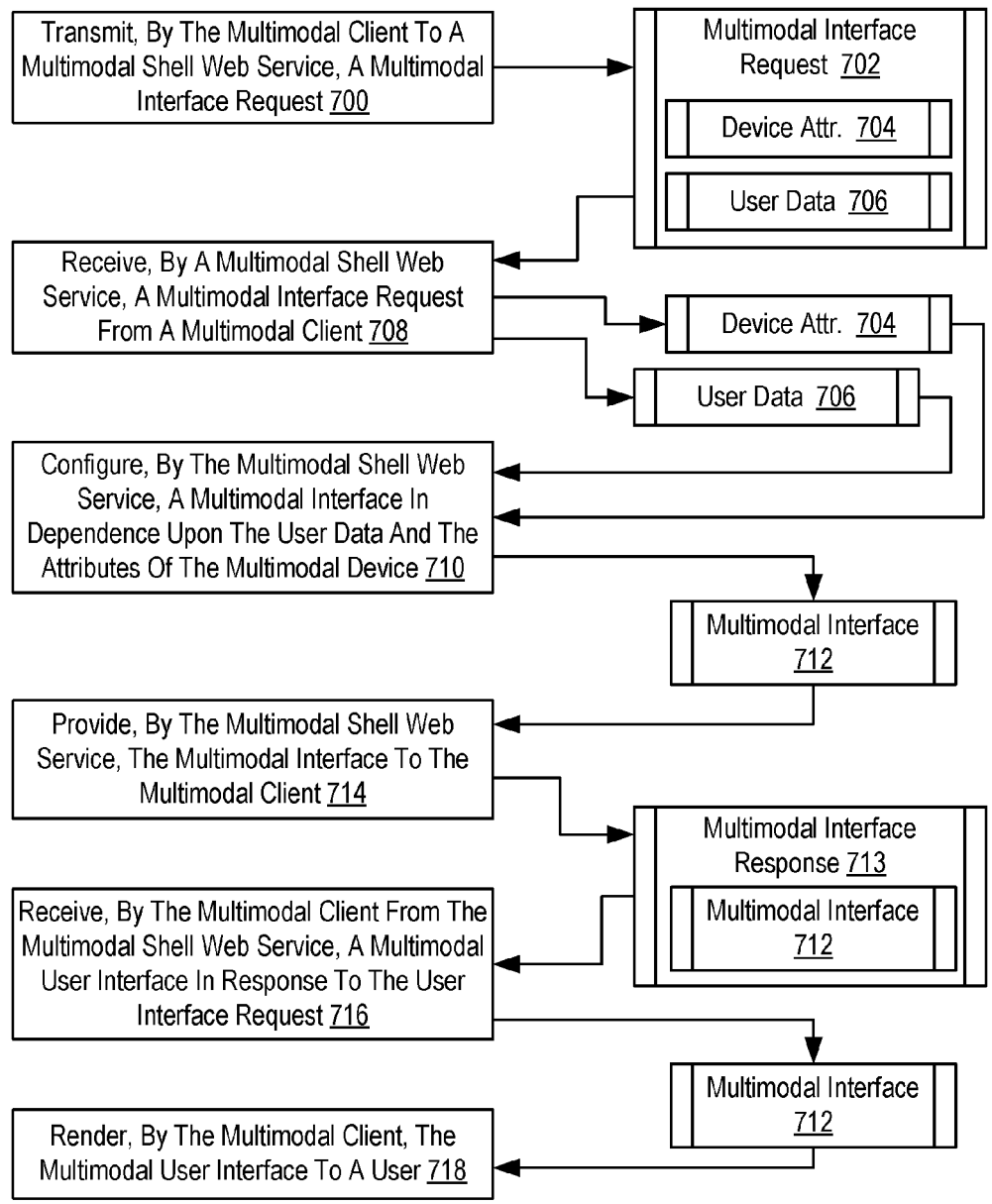
FIG. 7 sets forth a flow chart illustrating a further exemplary method of web service support for a multimodal client processing a multimodal application according to embodiments of the present invention.

Transmitting (700), by the multimodal client, a multimodal interface request (702) to a multimodal shell web service according to the method of FIG. 7 may be carried out by encapsulating user data (706) for a user of the multimodal device and attributes (704) of the multimodal device in an XML-based message according to the interface descriptor for the multimodal shell web service, wrapping the XML-based message with a SOAP header to form a SOAP message, and transmitting the SOAP message to the multimodal shell web service using HTTP. In the example of FIG. 7, the multimodal interface request (702) specifies user data (706) for a user of the multimodal device. The user data (706) represents data that describes a user of the multimodal device (152). For example, user data may include a user identifier, a user profile, or any other data describing a user of the multimodal device. The multimodal interface request (702) also specifies attributes (704) of the multimodal device. The attributes (704) of FIG. 7 describe the multimodal device itself and the software installed on the multimodal device. For example, attribute of the multimodal device may include a device identifier, display type for the device, information indicating whether the device supports JavaScript, the version of the multimodal browser installed on the device, the types of codecs supported by the device, or any other information describing the multimodal device as will occur to those of skill in the art.

The method of FIG. 7 also includes receiving (708), by a multimodal shell web service, a multimodal interface request (702) from the multimodal client. The multimodal shell web service may receive (708) the multimodal interface request (702) from the multimodal client according to the method of FIG. 7 by accepting a SOAP message from the multimodal client and unencapsulating the user data (706) and the device attributes (704) from the SOAP message.

The method of FIG. 7 also includes configuring (710), by the multimodal shell web service, a multimodal interface (712) in dependence upon the user data (706) and the attributes (704) of the multimodal device. The multimodal shell web service may configure (710) a multimodal interface (712) according to the method of FIG. 7 by retrieving interface components from an interface repository based on the user data (706) and the attributes (704) of the multimodal device. Interface components may include, for example, buttons, icons, lists, graphics, videos, voice dialogs, grammars, prompts, and so on, as well as executable code implemented using, for example, JavaScript to add a level of functionality to the other interface components. Using the user data (706) and the attributes (704) of the multimodal device allows a multimodal shell web service to configure a customized multimodal interface (712) for the multimodal client. Such a customized multimodal interface (712) advantageously provides the user with an interface that conforms to the user's personality by using color schemes, graphics, synthesized voices, and so on that appeal to the user in the interface (712). Such a multimodal interface (712) may also be used to allow advertisers to customize the multimodal interface (712) to include advertising content rendered to the user both visually and aurally through multimodal device on which the multimodal client operates.

The method of FIG. 7 includes providing (714), by the multimodal shell web service, the multimodal interface (712) to the multimodal client. The multimodal shell web service may provide (714) the multimodal interface (712) to the multimodal client according to the method of FIG. 7 by bundling the interface components of the multimodal interface (712) together in, for example, a Java Archive file, encapsulating the bundled components into a multimodal interface response (713) message implemented using SOAP, and transmitting the multimodal interface response (713) to the multimodal client.

The method of FIG. 7 includes receiving (716), by the multimodal client from the multimodal shell web service, a multimodal user interface (712) in response to the user interface request (702). The multimodal client may receive (716) a multimodal user interface (712) from the multimodal shell web service in response to the user interface request (702) according to the method of FIG. 7 by accepting the multimodal interface response (713) and unencapsulating the multimodal interface (712) from the multimodal interface response (713).

The method of FIG. 7 also includes rendering (718), by the multimodal client, the multimodal user interface (712) to a user. The method of FIG. 7 may render (718) the multimodal user interface (712) to the user according to the method of FIG. 7 by displaying the visual components of the multimodal interface (712) on a display screen of the multimodal device, playing any audio prompts provided, providing any voice dialogs to the appropriate voice modality web service for processing, and executing any scripts that provide further functionality for the multimodal interface (712).

Exemplary embodiments of the present invention are described largely in the context of a fully functional computer system for presenting supplemental content for digital media using a multimodal application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of processing a voice command spoken into a communication device, the method comprising:
   establishing a connection via a communication network between an application server and the communication device;
   receiving, by the application server, the voice command spoken into the communication device and communicated to the application server via said connection;
   accessing a web service stored on the application server;
   processing the voice command with the web service on the application server;
   determining, by a multimodal adapter of the application server, modality requirements for a multimodal application operating on the communication device, the modality requirements specifying characteristics of a modality web service capable of processing the voice command;
   selecting, by the multimodal adapter of the application server, the modality web service in dependence upon the modality requirements; and
   returning, from the application server to the communication device, a multimodal signal configured to render a user interface on the communication device.

2. The method of claim 1, wherein the voice command is an application request to control the multimodal application operating on the communication device.

3. The method of claim 1, wherein the communication network is a data communication network and the connection is a VOIP connection.

4. The method of claim 1, wherein the receiving further comprises:
   receiving, by the application server, an application request from a multimodal client operating on the communication device, the application request specifying the multimodal application and characteristics for the communication device.

5. The method of claim 4, wherein the multimodal signal comprises a multimodal user interface configured to support the multimodal application operating on the communication device.

6. The method of claim 5, wherein the application request comprises user data for a user of the communication device, said user data including user preferences for customizing the user interface.

7. The method of claim 6, wherein the user data specifies interface components for the user interface including at least one of buttons, icons, lists, graphics, videos, voice dialogs, grammars and prompts.

8. The method of claim 1, wherein the web service stored on the application server is said modality web service; and
   wherein said characteristics include data communications capabilities of the communication device, codecs supported by the communication device, and language settings for the communication device.

9. The method of claim 1, further comprising:
   determining, by the multimodal adapter of the application server, whether the communication device supports Voice Over Internet Protocol ("VoIP").

10. The method of claim 1, further comprising:
    encapsulating the modality web service into an HTTP message;
    wherein the returning of the multimodal signal comprises transmitting the HTTP message to the communication device in response to receiving the voice command.

11. A system configure to process a voice command spoken into a communication device, the system comprising:
    a connection to a communication network, said connection being configure to communicate signals between an application server and the communication device;
    the application server being configured to receive the voice command spoken into the communication device and communicated to the application server via said connection;
    a memory of the application server configured to store a web service;
    a processor of the application server configured to process said voice command;
    a multimodal adapter stored on the application server and configured to determine modality requirements for a multimodal application operating on the communication device, the modality requirements specifying characteristics of a modality web service capable of processing the voice command and select the modality web service in dependence upon the modality requirements; and
    a communication port of the application server configured to return to the communication device a multimodal signal for rendering a user interface on the communication device.

12. The system of claim 11, wherein the voice command is an application request to control the multimodal application operating on the communication device.

13. The system of claim 11, wherein the communication network is a data communication network and the connection is a VOIP connection.

14. The system of claim 11, wherein the application server is further configured to receive an application request from a multimodal client operating on the communication device, the application request specifying the multimodal application and characteristics for the communication device.

15. The system of claim 14, wherein the web service stored on the application server is said modality web service; and
    wherein said characteristics include data communications capabilities of the communication device, codecs supported by the communication device, and language settings for the communication device.

16. The system of claim 11, wherein the multimodal adapter of the application server is further configured to determine whether the communication device supports Voice Over Internet Protocol ("VoIP").

17. The system of claim 1, wherein the multimodal signal comprises a multimodal user interface configured to support the multimodal application operating on the communication device.

18. The system of claim 17, wherein the application request comprises user data for a user of the communication device, said user data including user preferences for customizing the user interface.

19. The system of claim 18, wherein the user data specifies interface components for the user interface including at least one of buttons, icons, lists, graphics, videos, voice dialogs, grammars and prompts.

20. The system of claim 11, wherein the application server encapsules the modality web service into an HTTP message; and
    wherein the returning of the multimodal signal comprises transmitting the HTTP message to the communication device in response to receiving the voice command.

* * * * *